(12) United States Patent
Ramanathan et al.

(10) Patent No.: US 10,425,366 B2
(45) Date of Patent: Sep. 24, 2019

(54) REMINDER SERVICE FOR EMAIL SELECTED FOR FOLLOW-UP ACTIONS

(71) Applicant: Microsoft Corporation, Redmond, WA (US)

(72) Inventors: Rajesh Ramanathan, Redmond, WA (US); Jasdeep Singh Chugh, Newcastle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 882 days.

(21) Appl. No.: 14/150,114

(22) Filed: Jan. 8, 2014

(65) Prior Publication Data

US 2015/0195233 A1    Jul. 9, 2015

(51) Int. Cl.
*H04L 12/58* (2006.01)

(52) U.S. Cl.
CPC .............. *H04L 51/18* (2013.01); *H04L 51/22* (2013.01)

(58) Field of Classification Search
CPC .... G06Q 10/10; G06Q 10/107; G06Q 10/109; H04L 29/08072; H04L 29/06; H04L 12/585; H04L 12/581
USPC ......................................................... 709/207
See application file for complete search history.

(56) References Cited

U.S. PATENT DOCUMENTS

| | | | |
|---|---|---|---|
| 7,788,589 B2 * | 8/2010 | Frankel | G06Q 10/06 709/204 |
| 8,375,320 B2 | 2/2013 | Kotler et al. | |
| 8,473,949 B2 | 6/2013 | Horvitz et al. | |
| 9,049,169 B1 * | 6/2015 | Zhou | H04L 63/0209 |
| 2002/0035608 A1 * | 3/2002 | Milovanovic | G06Q 10/10 709/206 |
| 2003/0120737 A1 * | 6/2003 | Lytle | G06Q 10/107 709/206 |
| 2006/0208861 A1 | 9/2006 | Stroupe et al. | |
| 2008/0005685 A1 * | 1/2008 | Drews | G06F 3/0481 715/764 |
| 2009/0106365 A1 * | 4/2009 | Drory | G06Q 10/107 709/206 |
| 2009/0113452 A1 * | 4/2009 | Grigsby | G06F 9/542 719/318 |
| 2009/0204966 A1 | 8/2009 | Johnson et al. | |
| 2009/0259493 A1 | 10/2009 | Venon et al. | |

(Continued)

FOREIGN PATENT DOCUMENTS

| | | |
|---|---|---|
| CN | 102792320 A | 11/2012 |
| CN | 103295122 A | 9/2013 |
| EP | 2665023 A1 | 11/2013 |

OTHER PUBLICATIONS

"International Search Report and Written Opinion Issued in PCT Patent Application No. PCT/US2014/071006", dated Jun. 16, 2015, 10 Pages.

(Continued)

*Primary Examiner* — William G Trost, IV
*Assistant Examiner* — Imran Moorad

(57) ABSTRACT

A reminder service is disclosed herein receives action information indicative of an email selected for follow-up action in an email application. The reminder service identifies an additional application through which to surface a reminder about the follow-up action and communicates reminder information to the additional application with which to render the reminder.

20 Claims, 7 Drawing Sheets

(56) References Cited

U.S. PATENT DOCUMENTS

| | | | | |
|---|---|---|---|---|
| 2010/0070448 | A1* | 3/2010 | Omoigui | H01L 27/1463 |
| | | | | 706/47 |
| 2011/0314375 | A1* | 12/2011 | Zaika | G06F 3/0482 |
| | | | | 715/708 |
| 2012/0124151 | A1* | 5/2012 | Au | G06F 9/542 |
| | | | | 709/206 |
| 2012/0129510 | A1* | 5/2012 | Bradburn | H04M 3/42127 |
| | | | | 455/418 |
| 2012/0311585 | A1* | 12/2012 | Gruber | H04W 4/02 |
| | | | | 718/100 |
| 2013/0138622 | A1 | 5/2013 | Ayers et al. | |
| 2013/0185650 | A1 | 7/2013 | Gutowitz | |
| 2013/0307681 | A1* | 11/2013 | Borg | G06Q 10/109 |
| | | | | 340/517 |
| 2013/0328786 | A1 | 12/2013 | Hinckley | |
| 2014/0052797 | A1* | 2/2014 | Lessard | H04L 51/18 |
| | | | | 709/206 |
| 2014/0082521 | A1* | 3/2014 | Carolan | H04L 51/00 |
| | | | | 715/752 |
| 2014/0172986 | A1* | 6/2014 | Kumar | G06Q 10/107 |
| | | | | 709/206 |
| 2015/0015409 | A1* | 1/2015 | Won | G08B 21/24 |
| | | | | 340/815.4 |
| 2015/0169696 | A1* | 6/2015 | Krishnappa | G06F 3/04842 |
| | | | | 707/722 |

OTHER PUBLICATIONS

"Made in IBM Labs: New 'Email Triage' Technology Helps Manage Urgent Issues on Mobile Devices", Published on: Jun. 16, 2010, Available at: http://www.prnewswire.com/news-releases/made-in-ibm-labs-new-email-triage-technology-helps-manage-urgent-issues-on-mobile-devices-96479314.html.

"SmarterMail 11.x", Published on: Jul. 22, 2012, Available at: http://www.smartertools.com/smartermail/whats-new.aspx.

Snelgrove, Nathan, "Make Email Truly Mobile with Triage", Published on: May 13, 2013, Available at: http://iphone.appstorm.net/reviews/productivity/make-email-truly-mobile-with-triage/.

Buthpitiya, et al., "Mobile Context-Aware Personal Messaging Assistant", in Mobile Computing, Applications, and Services, Oct. 26, 2009, 19 pages.

"Search Report Issued in European Patent Application No. 14828095.1", dated Jul. 18, 2017, 7 Pages.

"Office Action and Search Report Issued in Chinese Patent Application No. 201480072674.0", dated Mar. 14, 2018, 14 Pages.

"Second Office Action Issued in Chinese Patent Application No. 201480072674.0", dated Oct. 31, 2018, 5 Pages.

"Office Action Issued in European Patent Application No. 14828095.1", dated May 10, 2019, 4 Pages.

* cited by examiner

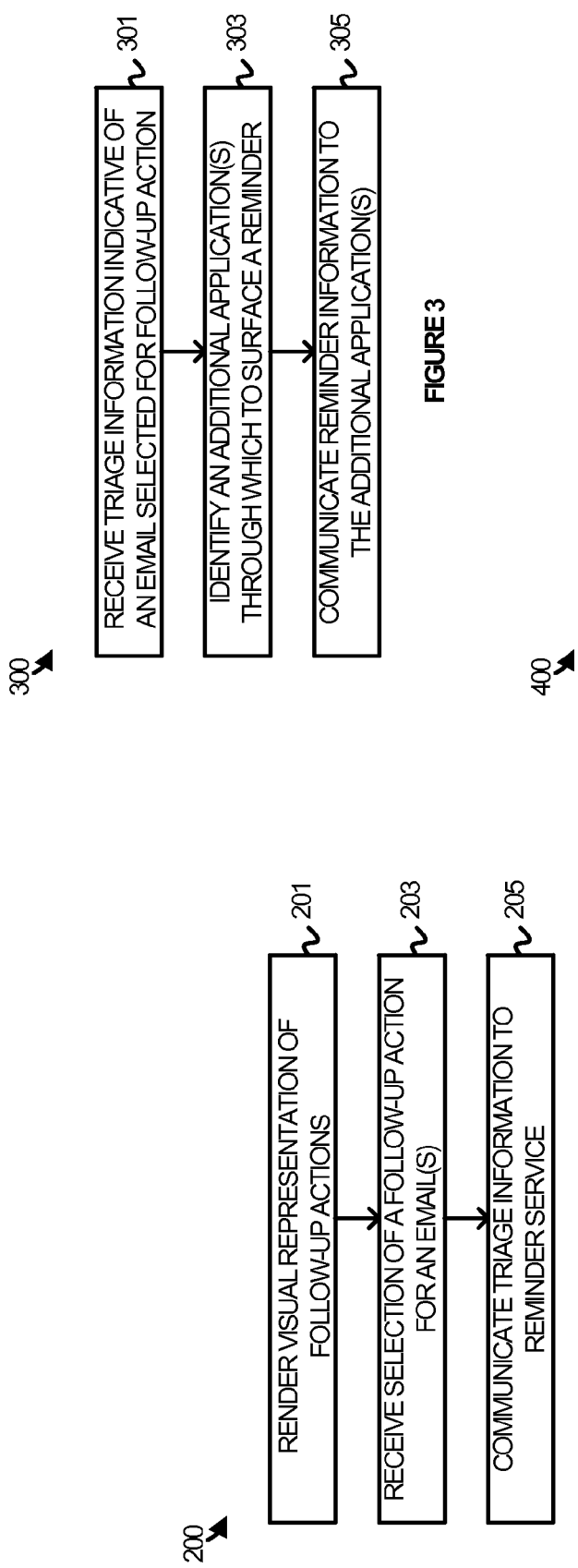

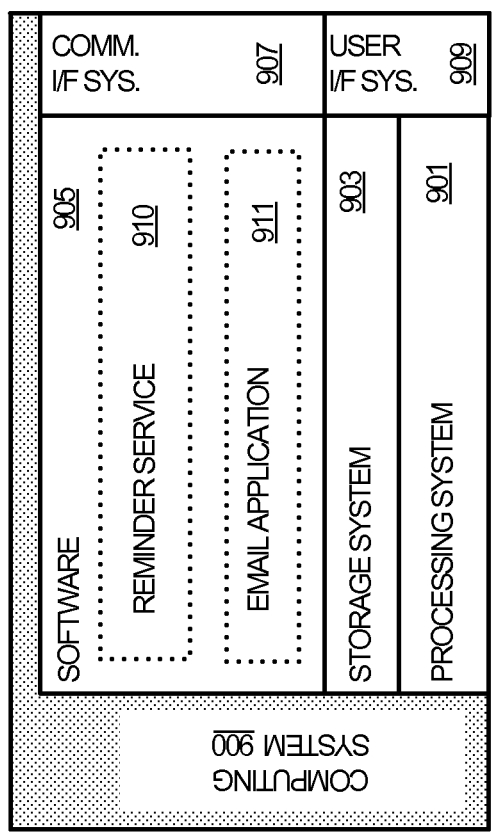

REMINDER SERVICE FOR EMAIL SELECTED FOR FOLLOW-UP ACTIONS

TECHNICAL FIELD

Aspects of the disclosure are related to computing hardware and software technology, and in particular to a reminder service for email.

TECHNICAL BACKGROUND

Email triage is an exercise engaged in by email users in order to organize messages in their inbox or other folders. When triaging their email, users make quick decisions about how to handle a given email, such as by electing to delete an email, move an email to another folder, or mark an email for later follow up.

Some email applications provide specific features to assist with triage, such as the follow-up feature in Microsoft® Outlook® that allows a user to mark an email for follow up later that day, the next day, or even in a matter of weeks or more. A task is then scheduled in the task module, a reminder can be set for the task, and so on.

Users frequently user their mobile devices to triage email. Mobile situations tend to lend themselves to brief interactions with one's inbox, such as when traveling or at other moments when there is enough time to make some decisions with respect to an email, but not enough time to prepare a detailed response or otherwise respond at length.

Many mobile email applications lack some of the features and functionality as their desktop counterparts, and thus may not offer triaging capabilities. In such situations, users sometimes resort to ad-hoc solutions to triage their email, such as by marking read messages as "un-read" so as to capture their attention later. At the very least, some limited triage is possible by deleting messages, but this is largely a sub-optimal experience.

However, one solution supports email triage in a mobile environment by providing a triage view of a user's mail in terms of those messages that have been triaged and those that remain un-triaged. The user can navigate to the triaged emails or possibly to the un-triaged emails. When dealing with the un-triaged emails, the user can elect an email to be handled next or deferred for later reference. A specific task can also be created in association with an email, such as to place a call or schedule a meeting related to the email.

As a user progresses through their email, various tasks will be created which can then be viewed later by way of a desktop email client. In addition to viewing their inbox, a user may view their tasks in the desktop email client, organized in various ways, such as by the task type or by when the tasks are due.

Overview

Provided herein are systems, methods, and software for implementing a reminder service that allows users to organize email in an email application such that they may be reminded about a follow-up action in another application.

In at least one implementation, a reminder service receives action information indicative of an email selected for follow-up action in an email application. The reminder service identifies an additional application through which to surface a reminder about the follow-up action and communicates reminder information to the additional application with which to render the reminder.

In some implementations, a user interface to an email service may be rendered that includes a triage menu through which to select a follow-up action for an email. Another user interface to an additional service may also be rendered that includes a reminder about the follow-up action for the email.

This Overview is provided to introduce a selection of concepts in a simplified form that are further described below in the Technical Disclosure. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

FIG. 2 illustrates a triage process in an implementation.

FIG. 3 illustrates a triage process in an implementation.

FIG. 4 illustrates a triage process in an implementation.

FIG. 9 illustrates a computing system in an implementation.

TECHNICAL DISCLOSURE

Implementations disclosed herein refer to a reminder service for enhancing email triage. When engaged with an email application, a user may select an email for a follow-up action. When engaged later with another application, such as another email client, a productivity application, a contacts application, or a game, for example, the user may be reminded of the email and the follow-up action. In this manner, awareness of email that is triaged using one application is not lost or dissipated when engaged with other applications.

In at least one implementation, a reminder service receives action information indicative of an email selected for follow-up action in an email application and responsively identifies an additional application through which to surface a reminder about the follow-up action. The reminder service communicates reminder information to the additional application with which to render the reminder.

In some scenarios, the additional application may be selected from various other applications based at least in part on with which of the applications the follow-up action is associated. Examples of the other applications include, but are not limited to, a real-time communication application, a contacts application, a calendar application, a productivity application, and an additional email application. Examples of follow-up actions include reading the email later, replying to the email later, placing a call related to the email later, and scheduling a meeting related to the email later.

The follow-up action may be selectable in some implementations from a triage menu in the email application. The applications may be associated with the various follow-up actions such that, in at least one scenario, the follow-up action is associated with an additional email application and at least one other application. The additional application may be, for instance, a contacts application, in which case a reminder may be rendered in a user interface to the contacts application. The reminder may even be rendered in visual association with one of various contacts included in the user interface. In other instances, the additional application may be a productivity application, in which case the reminder may be rendered in a user interface to the productivity application. For example, the reminder may be included in a most recently used (M.R.U.) menu in visual association with a document represented in the most recently used menu.

Figure 1:
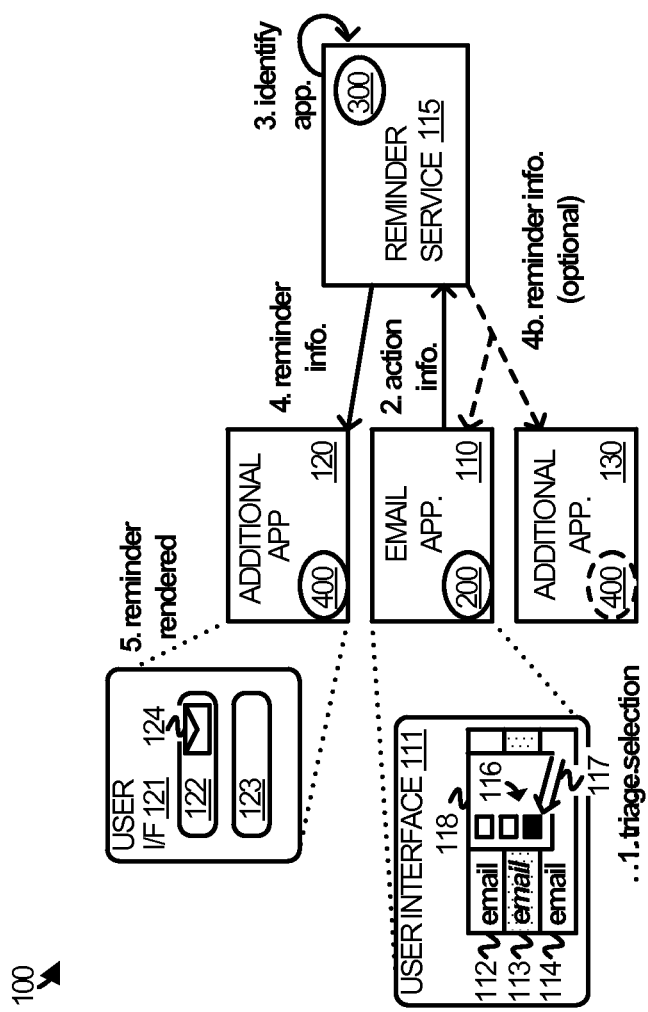
FIG. 1 illustrates an operational scenario in an implementation.
Figure 5B:
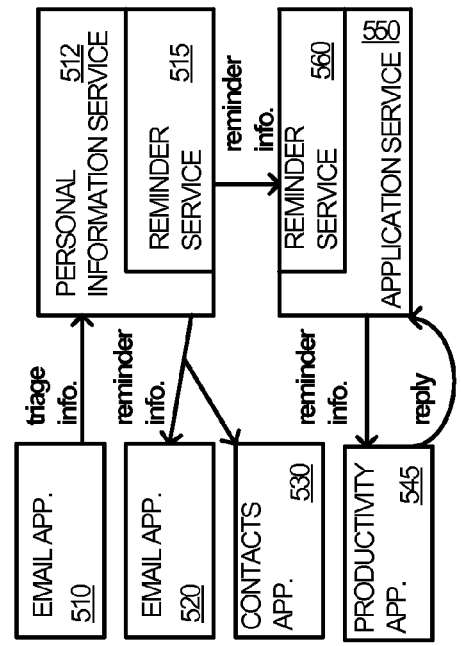
FIG. 5B illustrates an operational scenario in an implementation.
Figure 5A:
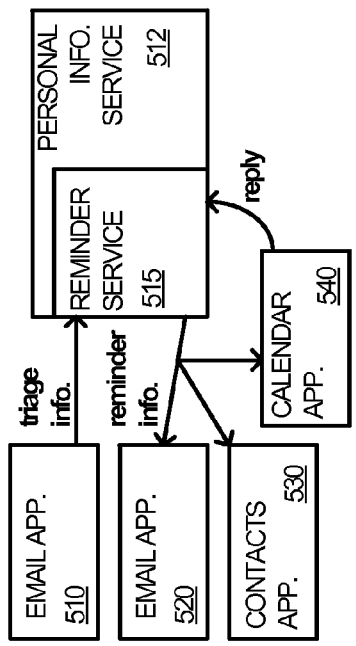
FIG. 5A illustrates an operational scenario in an implementation.
Figure 6:
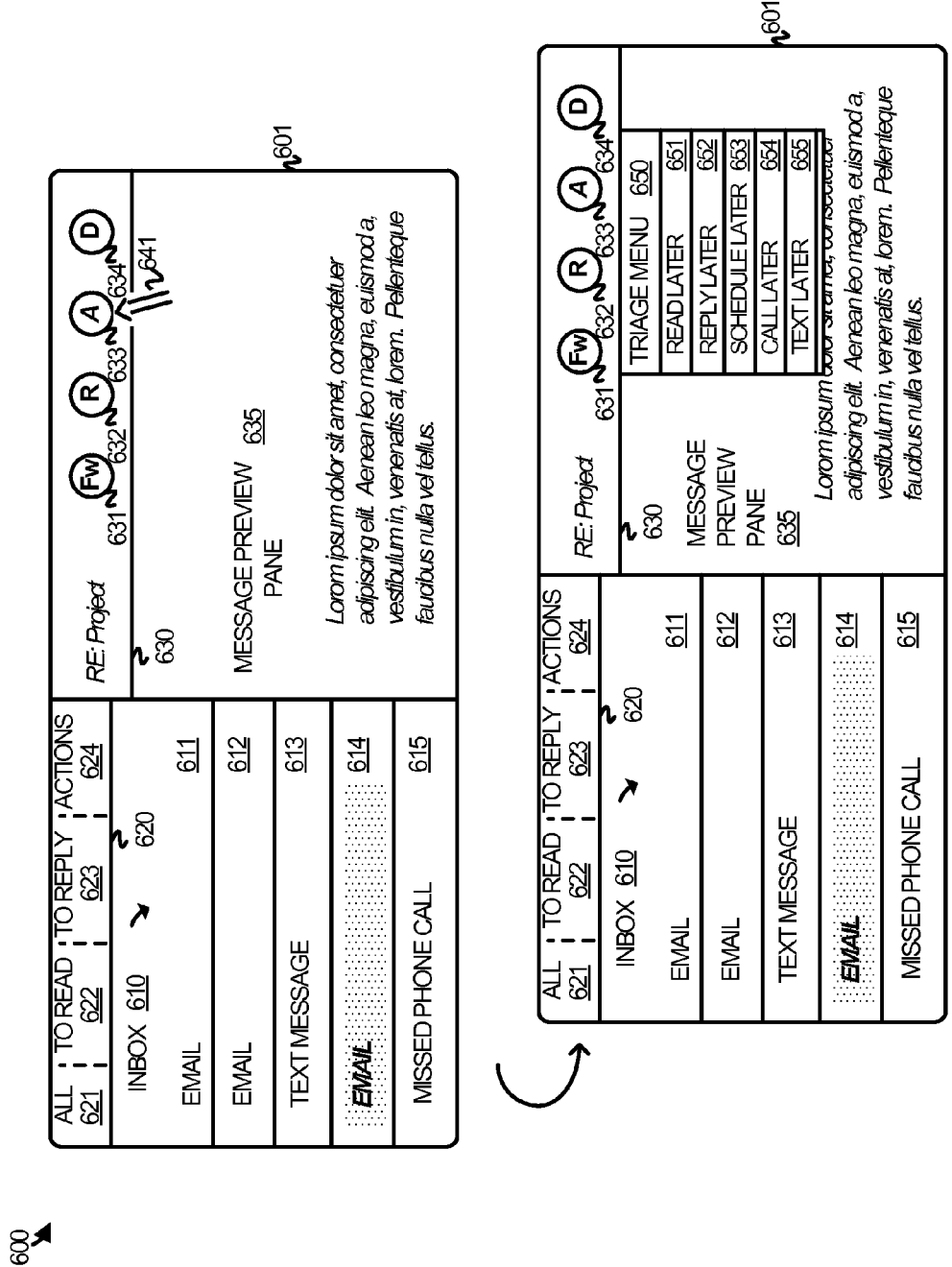
FIG. 6 illustrates a user interface to an email application and an associated operational scenario in an implementation.

Referring now the drawings, FIG. 1 illustrates an operational scenario in an implementation in which an email application and additional applications interact with a reminder service. FIGS. 2-4 illustrates triage processes employed by the email application, the reminder service, and the additional applications. FIG. 5A and FIG. 5B illustrate two more operational scenarios. FIG. 6 illustrates a user interface to an email application in an operational scenario, as does FIG. 7. FIG. 8 illustrates a user interface to a contacts application and a user interface to a productivity application. FIG. 9 illustrates a computing system representative of any apparatus, device, or collections thereof suitable for implementing a reminder service, an email application, or an additional application, and for implementing the various operational scenarios disclosed herein.

In operational scenario 100 illustrated in FIG. 1, an email application 110 is in communication with a reminder service 115 to facilitate enhanced email triage. Reminder service 115 may also be in communication with an additional application 120 and another additional application 130.

Email application 110 is representative of any software application, module, component, or collections thereof for conducting email, with which a user may engage in order to obtain access to and interact with an email service (not shown). Email application 110 is capable of employing triage process 200, described in more detail below with respect to FIG. 2. Various types of physical or virtual computing systems may be used to implement email application 110, such as server computers, desktop computers, laptop computers, tablet computers, smart phones, gaming appliances, or any other suitable computing appliance, of which computing system 900, discussed below with respect to FIG. 9, is representative. Email application 110 may be locally installed and executed, executed from within the context of a browser, streamed, or otherwise delivered in some other suitable manner, including combinations or variations thereof.

Reminder service 115 is representative of any software application, module, component, or collections thereof capable employing triage process 300 in support of triage decisions made with respect to email application 110. Reminder service 115 may be implemented in a stand-alone fashion or may be implemented within other environments in an integrated or cooperative fashion.

Various types of physical or virtual computing systems may be used to implement triage process 300 within the context of reminder service 115, such as server computers, desktop computers, laptop computers, tablet computers, smart phones, or any other suitable computing appliance, of which computing system 900, discussed below with respect to FIG. 9, is representative. When implemented using a server computer, any of a variety of servers may be used including, but not limited to, application servers, database servers, mail servers, rack servers, blade servers, tower servers, or any other type of server, variation or combination thereof.

Additional application 120 is representative of any software application, module, component, or collection thereof, capable of rendering a reminder about an email selected for triage. Examples of additional application 120 include, but are not limited to, productivity applications, contact applications, calendar applications, games, and email applications, as well as any other type of application. Additional application 130 is also representative of such applications. Both additional application 120 and additional application 130 are capable of employing triage process 400 to facilitate enhanced triage. Various types of physical or virtual computing systems may be used to implement additional application 120 and additional application 130, such as server computers, desktop computers, laptop computers, tablet computers, smart phones, gaming appliances, or any other suitable computing appliance, of which computing system 900, discussed below with respect to FIG. 9, is representative. Additional application 120 and additional application 130 may be locally installed and executed, executed within the context of a browser, streamed, or otherwise delivered in some other suitable manner.

In operational scenario 100, a user interacts with email application 110 through user interface 111, which is a user interface to an email service. For example, a user may interact with their email, compose or read messages, move and sort messages, or otherwise perform any number of actions using user interface 111.

User interface 111 includes a list of emails representative of those a user may encounter in an inbox, or some other folder, including email 112, email 113, and email 114. It may be appreciated that other elements are possible, in place of or in addition to those included in user interface 111, and may be considered within the scope of the present disclosure. It is assumed for exemplary purposes that email 113 has been selected for triaging, as indicated by its shaded representation.

In addition, a triage menu 118 has been selected or otherwise surfaced, which includes follow-up actions 116 selectable from the triage menu 118. A user input 117 or selection is made from the triage menu 118 of one of the follow-up actions 116, in response to which action information is communicated by email application 110 to reminder service 115. The action information identifies the email (or emails) and the follow-up action.

Reminder service 115 receives the action information and responsively identifies which additional application corresponds to the follow-up action identified in the action information. In this scenario, it is assumed for exemplary purposes that additional application 120 corresponds to the follow-up action. Accordingly, reminder service 115 communicates reminder information to additional application 120 indicative of the follow-up action and the email. Optionally, reminder service 115 may also communicate reminder information to additional application 130.

Additional application 120 receives the reminder information and presents it in user interface 121. User interface 121 includes interface element 122 and interface element 123, which are representative of any graphical elements, or any other type of element, that may be encountered in a user interface. A reminder 124 is rendered in user interface 121 such that a user may be reminded of the email and the follow-up action when interacting with interface elements in user interface 121. Reminder 124 is positioned in visual association with interface element 122 for exemplary purposes, although it may be appreciated that it may be arranged visually in user interface 121 in any other way.

FIG. 2 illustrates triage process 200 which may be employed by email application 110 within the context of operational scenario 100, although it may be appreciated that triage process 300 could be employed in other scenarios. In operation, email application 110 renders a visual representation of follow-up actions (step 201). While triage menu is an example of a drop-down menu, a variety of other menus or other ways in which to present the follow-up actions from which a user may make a selection are possible and may be considered within the scope of the present disclosure.

Next, email application 110 receive a selection input by a user via user interface 111 selecting a particular email or emails for triage and identifying one of the follow-up actions from the presentation of follow-up actions (step 203). The selection may be made by, for example, a gesture, a touch, a mouse click, or some other suitable user input.

Upon receiving the selection(s) via user interface 111, email application 110 communicates action information to reminder service 115 indicative of the email or emails selected for triage and the associated follow-up action (step 205). Reminder service 115 may then handle the action information in accordance with triage process 300.

FIG. 3 illustrates triage process 300 which may be employed by reminder service 115 in the context of operational scenario 100, although it may be appreciated that triage process 300 could be employed in other scenarios. In operation, reminder service 115 receives action information from an email application, such as email application 110 (step 301). The action information identifies an email or emails selected for triage and an associated follow-up action. Reminder service 115 proceeds to identify which additional application or applications is associated with the follow-up action and through which a reminder may be surface (step 303).

In an example, the follow-up action may be to call a person associated with the triaged email, in which case the additional application associated with the follow-up action may be a dialer application, a contacts application, a voice calling application, or some other application generally associated with placing calls. In another example, the triaged email may include an attachment and the follow-up action may be to read the triaged email. The associated application may be a reader application or some other productivity application with which the attachment can be read. In yet another example, the follow-up action may be to schedule an event, in which case the associated application may be a calendar application.

Such associations between additional applications and follow-up actions may be configured at any time. The associations may be configured manually, automatically, programmatically, or in some other manner. The follow-up actions may be associated with just one application but may also be associated with more than one application. The follow-up actions are generally associated with applications based on a functional relationship between the actions and the applications. For instance, a follow-up action to place a call may be associated with one or more applications suitable for placing a call. However, other associations can be made. Thus, an additional email application may be associated with any follow-up action so that reminders can be surfaced through the additional email application, regardless of whether or not the additional email application is suitable for performing the follow-up action.

Having identified the appropriate additional application or applications, reminder service 115 communicates reminder information to the application or applications (step 305). Such communication may occur in a variety of ways, such in a push manner in which reminder service 115 initiates communication with the additional application(s) in order to transfer the reminder information. However, reminder service 115 may also be polled by the various applications on a periodic basis or some other basis. Other communication mechanisms are possible for conveying reminder information and may be considered within the scope of the present disclosure.

FIG. 4 illustrates triage process 400 which may be employed by other applications, such as additional application 120 or additional application 130, in the context of operational scenario 100, although it may be appreciated that triage process 300 could be employed in other scenarios. In operation, user interface 121 is invoked and presented by additional application 120 (step 401). Before, during, or after when user interface 121 is invoked, additional application 120 receives reminder information from reminder service 115 indicative of a triaged email and an associated follow-up action (step 403).

The email and follow-up action may be identified directly in the reminder information. For instance, the reminder information may specifically identify the email by a name, a link, or some other identifier. The follow-up action may also be specifically identified by a name, a link, or some other identifier. However, the email and the follow-up action may be identified indirectly by the reminder information. For instance, the reminder information may merely indicate in general that an email exists that has been triaged and that has an associated follow-up action. Other ways of representing the email and the follow-up action in reminder information are possible, in addition to or in place of those disclosed herein, and may be considered within the scope of the present disclosure.

Having received the reminder information, additional application 120 renders a reminder in user interface 121 (step 405). The reminder may be represented in text, as a graphical element, or in some other manner that serves to visually remind a user about a triaged email. In some scenarios, the reminder may be rendered as an email icon or image, although other types of images are possible, such as a star, color coding, font modifications, and the like.

FIG. 5A illustrates another operational scenario 501 in an implementation in which multiple additional applications are capable of surfacing reminders, including an email application 520, a contacts application 530, and a calendar application 540. In addition, operational scenario 501 involves a personal information service 512 in the context of which a reminder service 515 may be implemented.

Examples of personal information service 512 include, but are not limited to, Microsoft® Exchange®, Gmail®, and Yahoo!® Mail, as well as any other suitable personal information service, variation, or combination thereof. Reminder service 515 is representative of any software service, application, module, component, or variations and combinations thereof that may run within the context of personal information service 512. Personal information service 512 and reminder service 515 may be implemented using any suitable computing system or collection of computing systems, of which computing system 900 illustrated in FIG. 9 is representative.

Email application 510 is representative of any email application, module, or component capable of communicating triage information. Email application 520 is representative of any email application, module, or component capable of receiving reminder information and surfacing a reminder. Contacts application 530 is representative of any contacts application, module, or component capable of receiving reminder information and surfacing a reminder. Calendar application 540 is representative of any calendar application, module, or component capable of receiving reminder information and surfacing a reminder.

Email application 510, email application 520, contacts application 530, and calendar application 540 may be implemented as separate applications or in an integrated fashion within the context of another application. In addition, email application 510, email application 520, contacts application 530, and calendar application 540 may be implemented on a single device or on multiple, different devices. Any combination of applications and devices is also possible and may be considered within the scope of the present disclosure.

In operational scenario 501, an email is selected for follow-up action and email application 510 communicates triage information indicative of the same to reminder service 515. The triage information may be communicated directly to reminder service 515 or indirectly through personal information service 512.

Reminder service 515 identifies which other applications are associated with the follow-up action indicated by the triage information and communicates reminder information to those applications about the triaged email. In operational scenario 501, it is illustrated that reminder service 515 communicates reminder information to all three of email application 520, contacts application 530, and calendar application 540. However, it may be appreciated that fewer than all three may be supplied with the reminder information.

In some implementations, an application that receives the reminder information may also be capable of replying to the reminder information. For example, an application may provide a user with the ability to dismiss or change the status of a triaged email through the user interface to that application. A follow-up action could be changed from one action to another, for example, or deleted entirely. In another example, a follow-up action could be marked as complete and a reply provided by an associated application to reminder service 515. The completed status of the follow-up action may then be provided to a user's mailbox or other email repository in personal information service 512.

FIG. 5B illustrates yet another operational scenario 503 in an implementation in which additional applications are capable of receiving reminder information from reminder service 515, but in some instances by way of an application service. In particular, operational scenario 503 involves email application 510, email application 520, contacts application 530, productivity application 545, personal information service 512, reminder service 515, application service 550, and reminder service 560.

In operational scenario 503, an email is selected for follow-up action and email application 510 communicates triage information indicative of the same to reminder service 515. The triage information may be communicated directly to reminder service 515 or indirectly through personal information service 512.

Reminder service 515 identifies which other applications are associated with the follow-up action indicated by the triage information and communicates reminder information to those applications about the triaged email. In operational scenario 501, it is illustrated that reminder service 515 communicates reminder information to email application 520 and to contacts application 530. However, reminder service 515 also communicates reminder information to reminder service 560, which resides in application service 550.

Reminder service 560 may be any software application, module, or component capable of receiving reminder information from reminder service 515. Application service 550 may be any software application, service, module, component, or collections thereof, capable of providing a productivity application service to productivity application 545 and in which reminder service 560 may be hosted. Application service 550 and reminder service 560 may be implemented using any suitable computing system or collections of computing systems, of which computing system 900 is representative.

Reminder service 560, by way of application service 550, communicates reminder information to productivity application 545. Productivity application 545 may then surface a reminder to a user through a user interface to application service 550. It may be appreciated that, although reminder information is supplied to all three additional applications in operational scenario 503, in some scenarios fewer than all three may be involved.

In some implementations, an application that receives the reminder information may also be capable of replying to the reminder information. For example, an application may provide a user with the ability to dismiss or change the status of a triaged email through the user interface to that application. A follow-up action could be changed from one action to another, for example, or deleted entirely. In another example, a follow-up action could be marked as complete and a reply provided by an associated application to reminder service 515. The completed status of the follow-up action may then be provided to a user's mailbox or other email repository in personal information service 512.

FIG. 6 illustrates an operational scenario 600 involving a user interface 601 to an email service. User interface 601 may be rendered by an email application executed by a suitable computing system, of which computing system 900 is representative.

In operation, an initial view in user interface 601 is rendered that includes an inbox 610, a filter menu 620, a function menu 630, and a message preview pane 635. A user may interact with the various features and functions of user interface 601 to, for example, read and compose emails and other types of messages and notifications. In addition, a user may triage their email using some of the features and functions of user interface 601.

Inbox 610 includes various messages and other items, including email 611, email 612, text message 613, email 614, and a notification 615 of a missed phone call. Which items are displayed in inbox 610 may depend on how it is set to be filtered. In particular, filter menu 620 allows a user to filter items based on how they have been triaged. For example, filter menu 620 includes a control 621 for viewing all emails, a control 622 for viewing those selected be read later, a control 623 for viewing those selected to be replied to later, and a control 624 for performing triage and picking follow-up actions for any of the items in inbox 610.

Triage may also be performed on an email via function menu 630. In function menu 630, various options are available for whichever item is selected for viewing in message preview pane 635. In this scenario, email 614 has been selected and its content is displayed in message preview pane 635. Email 614 may be subject to the various controls in function menu 630, including a control 631 for forwarding an email, a control 632 for replying to an email, a control 634 for deleting an email, and a control 633 for surfacing a triage menu with which email 614 may be triaged.

Upon selection of control 633, represented by user input 641, a triage menu 650 is rendered which various follow-up actions included therein. The follow-up actions include one follow-up action 651 for reading the email later, a follow-up action 652 for replying to the email later, a follow-up action 653 for scheduling a meeting later, a follow-up action 654 for placing a call later, and a follow-up action 655 for texting later. It may be appreciated that other follow-up actions in addition to or in place of those disclosed herein may be included in triage menu 650. In addition, it may be appreciate that triage menu 650 may also be rendered in response to a selection of control 624.

Figure 7:
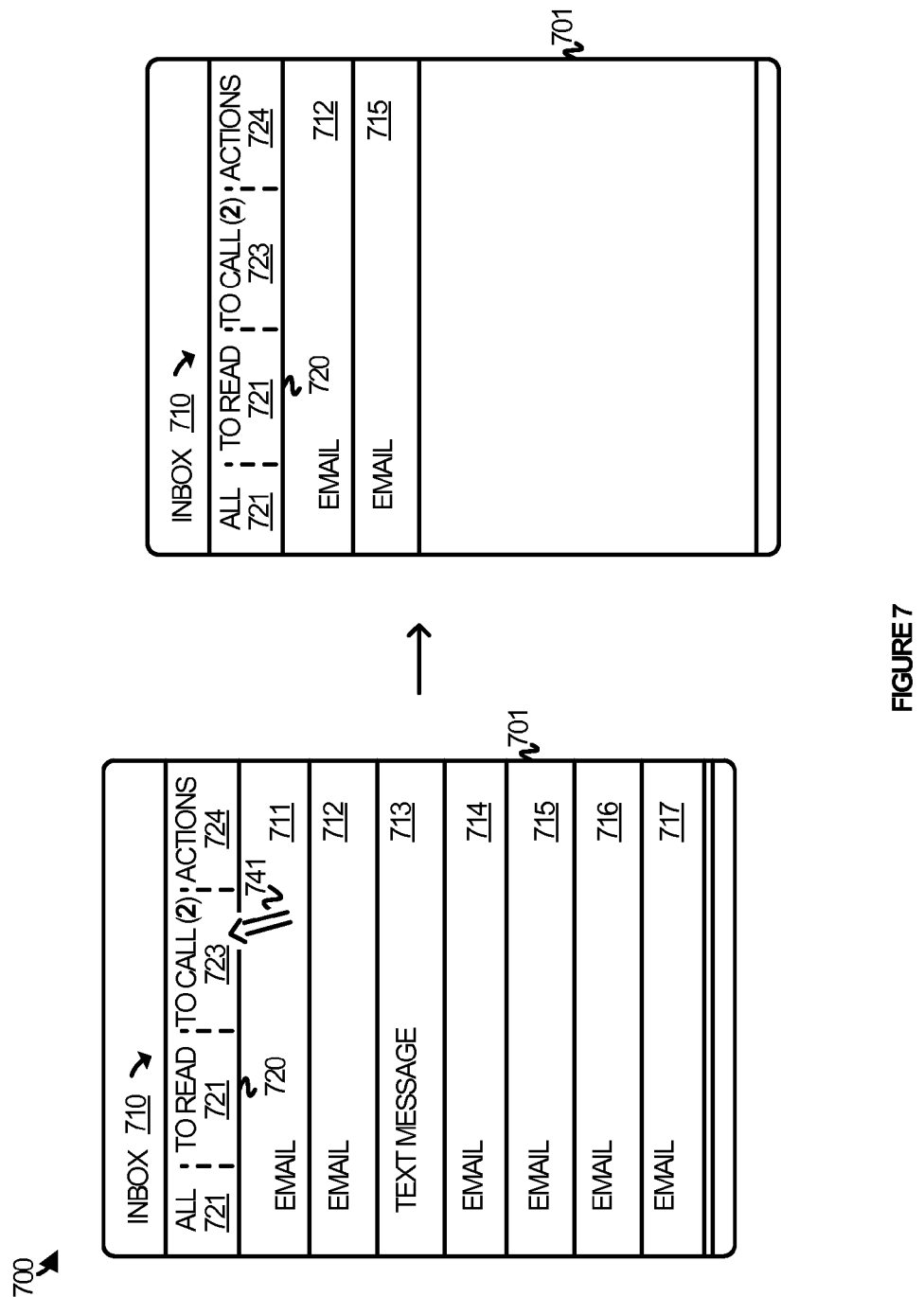
FIG. 7 illustrates an operational scenario in an implementation.
Figure 8:
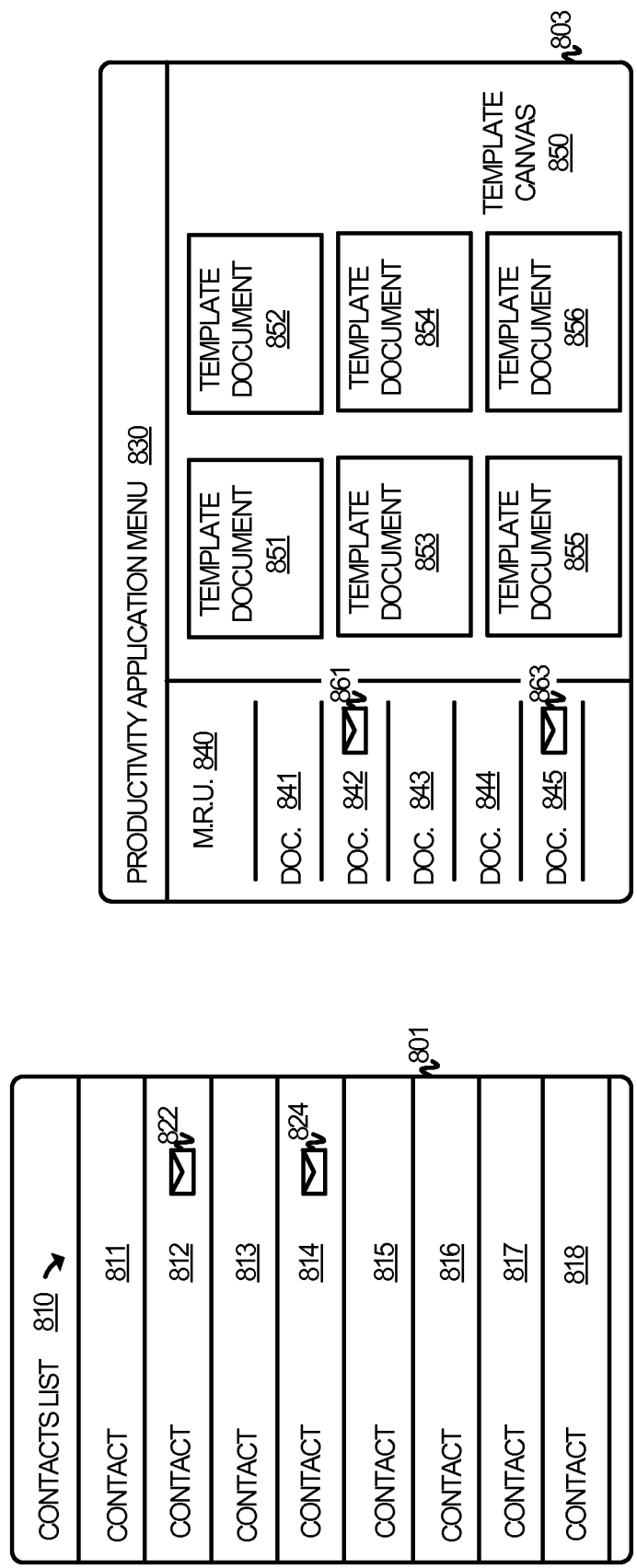
FIG. 8 illustrates an operational scenario in an implementation.

FIG. 7 illustrates an operational scenario 700 involving another user interface 701 to an email service. User interface 701 may be rendered by an email application executed by a suitable computing system, of which computing system 900 is representative.

In operation, an initial view in user interface 701 is rendered that includes an inbox 710 and a filter menu 720. A user may interact with the various features and functions of user interface 701 to, for example, read and compose emails and other types of messages and notifications. In addition, a user may triage their email using some of the features and functions of user interface 701.

Inbox 610 includes email 711, email 712, text message 713, email 714, email 715, email 716, and email 717. Which items are displayed in inbox 710 may depend on how it is set to be filtered. In particular, filter menu 720 allows a user to filter items based on how they have been triaged. For example, filter menu 720 includes a control 721 for viewing all emails, a control 722 for viewing those selected be read later, a control 723 for viewing those selected for a later phone call, and a control 724 for performing triage and picking follow-up actions for any of the items in inbox 710.

In this scenario, a user input 741 is initiated to select control 723, which triggers inbox 710 to be filtered to only those items for which a phone call is to be placed. Accordingly, user interface 701 is modified such that only email 712 and email 715 are displayed in inbox 710 as those two emails were triaged earlier for phone calls.

In some implementations, which filter options are rendered in filter menu 720 may be dynamically determined. For example, the ability to filter by emails subject to phone calls may be surfaced in an email application running on a smart phone, but not on some other device that lacks phone calling capability, or for which phone calls are not a main function. In another example, the ability to filter by emails triaged for text messaging may not be surfaced on a device that lacks text messaging capability. Other contextual influences on what options may be surfaced may be considered within the scope of this disclosure.

It may be appreciated that user interface 701 could be considered a subsequent user interface in that a user may triage email using a different user interface to the same email service. For example, a user may triage their email using an email application on one device and then interact with the triaged email using another email application on another device. Thus, user interface 701 may be considered a subsequent user interface because a user may have used a different user interface previously.

FIG. 8 illustrates two exemplary user interfaces, including user interface 801 to a contacts service and user interface 803 to a productivity service. User interface 801 may be rendered when a contacts application is executed by a suitable computing system, of which computing system 900 is representative. User interface 803 may also be rendered when a productivity application is executed by a suitable computing system. User interface 801 and user interface 803 both illustrate various ways in which a reminder may be surface to remind a user about an email or other item that has been triaged for follow-up action.

User interface 801 includes a contacts list 810 in which various contacts 811-818 are displayed. User interface 801 also includes reminder 822 and reminder 824 that are surfaced to remind a user about a triaged item. Reminder 822 may be a graphical element that reminds a user an email and is displayed in visual association with contact 812. In some implementations, the visual association may be driven by a logical association between the triaged email and a contact, such as when a participant in the email is the contact. For example, an email from a sender may be triaged for later follow-up action. A reminder that is then rendered for the email can be displayed in visual association with the contact for the sender so that, when a user is browsing contacts list 810, he or she is reminded of the email. Reminder 824 may also be visually associated with contact 814 so as to remind a user about an email involving a person associated with contact 814. Other types of reminders and other ways in which to visually present the reminders are possible and may be considered within the scope of the present disclosure.

User interface 803 includes a productivity application menu 830 in which various features and functions of a productivity application or service may be made available. User interface 803 also includes a most recently used menu 840 and a template canvas 850. The view presented by user interface 803 may be one that is encountered by a user when initially launching a productivity application, for instance.

Most recently used menu 840 includes representations 841-845 of various documents that were used recently. Template canvas 850 includes various template documents 851-856 from which a user may select a template when creating a document. User interface 803 also includes a reminder 861 surfaced in visual proximity to a representation 842 of a document and reminder 863 surfaced in visual proximity to another representation 845 of a document.

Reminder 861 and reminder 863 may each be a graphical element that reminds a user about an email that may be associated with a document represented in most recently used menu 840. For example, an email may be triaged for later reading that includes an attachment. The attachment can be surfaced as a document in the most recently used menu 840. In another example, an email triaged for later reading may have been sent by a person that created, modified, or is somehow else related to one of the documents represented in most recently used menu 840. As such a reminder about the email can be surfaced nearby a representation of that document. Other types of reminders and other ways in which to visually present the reminders in a most recently used menu are possible and may be considered within the scope of the present disclosure. It may also be appreciated that reminders could be surfaced in a user interface to a productivity application service in other ways, such as in other menus, on template canvas 850, or elsewhere.

FIG. 9 illustrates computing system 900, which is representative of any suitable computing system or collection of systems that may be employed to implement all or portions of a reminder service 910. Examples of reminder service 910 include reminder service 115 and reminder service 515.

Examples of computing system 900 include server computers, rack servers, web servers, cloud computing platforms, and data center equipment, as well as any other type of physical or virtual server machine, and any variation or combination thereof. In some implementations, a collection of multiple computing systems may be employed to implement all or portions of a collaboration service which may be hosted in one or more data centers, virtual data centers, or any other suitable computing facilities.

Computing system 900 is also representative of any suitable computing system or collection of systems that may be employed to implement all or portions of an email application 911, or any other application. Examples of email application 911 include but are not limited to email application 110, email application 510, and email application 520, as well as any other email application. Computing system 900 is also representative of any computing system suitable for implementing any of the user interfaces 111, 601, 701, 801, and 803, as well as any other user interface. Examples of computing system 900 also include, but are not limited to, desktop computers, laptop computers, tablet computers, notebook computers, mobile computing devices, smart phones, cell phones, media devices, and gaming devices, as well as any other type of physical or virtual computing machine.

Computing system 900 may be implemented as a single apparatus, system, or device or may be implemented in a distributed manner as multiple apparatuses, systems, or devices. Computing system 900 includes, but is not limited to, processing system 901, storage system 903, software 905, communication interface system 907, and user interface system 909. Processing system 901 is operatively coupled with storage system 903, communication interface system 907, and user interface system 909. User interface system 909 is optional in some implementations. Processing system 901 loads and executes software 905 from storage system 903. When executed by processing system 901, software 905 directs processing system 901 to operate as described herein for any one or more of reminder services 115 and 515, as well as email applications 110, 510, and 520, and optionally as described for any of the user interfaces and operational scenarios and sequences disclosed herein. Computing system 900 may optionally include additional devices, features, or functionality not discussed for purposes of brevity.

Referring still to FIG. 9, processing system 901 may comprise a microprocessor and other circuitry that retrieves and executes software 905 from storage system 903. Processing system 901 may be implemented within a single processing device but may also be distributed across multiple processing devices or sub-systems that cooperate in executing program instructions. Examples of processing system 901 include general purpose central processing units, application specific processors, and logic devices, as well as any other type of processing device, combinations, or variations thereof.

Storage system 903 may comprise any computer readable storage media readable by processing system 901 and capable of storing software 905. Storage system 903 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 903 may also include computer readable communication media over which software 905 may be communicated internally or externally. Storage system 903 may be implemented as a single storage device but may also be implemented across multiple storage devices or sub-systems co-located or distributed relative to each other. Storage system 903 may comprise additional elements, such as a controller, capable of communicating with processing system 901 or possibly other systems.

Software 905 may be implemented in program instructions and among other functions may, when executed by processing system 901, direct processing system 901 to operate as described herein as described with respect to the various operational scenarios disclosed herein. In particular, the program instructions may include various components or modules that cooperate or otherwise interact to carry out the various processes and operational scenarios described herein. The various components or modules may be embodied in compiled or interpreted instructions or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 905 may include additional processes, programs, or components, such as operating system software or other application software. Software 905 may also comprise firmware or some other form of machine-readable processing instructions executable by processing system 901.

In general, software 905 may, when loaded into processing system 901 and executed, transform a suitable apparatus, system, or device (of which computing system 900 is representative) overall from a general-purpose computing system into a special-purpose computing system customized to facilitate enhanced email triage as described herein for each implementation. Indeed, encoding software 905 on storage system 903 may transform the physical structure of storage system 903. The specific transformation of the physical structure may depend on various factors in different implementations of this description. Examples of such factors may include, but are not limited to, the technology used to implement the storage media of storage system 903 and whether the computer-storage media are characterized as primary or secondary storage, as well as other factors.

For example, if the computer readable storage media are implemented as semiconductor-based memory, software 905 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Referring again to FIG. 1 as an example, through the operation of a computing system or systems of which computing system 900 is representative, transformations may be performed with respect to a user interface to an email service, such as user interface 111 and user interface 121. As an example, a user may select an email for triage in user interface 111. Accordingly, a reminder is surfaced in user interface 121, thereby changing the state of user interface 121 from a first state (without the reminder) to a second, transformed state (with the reminder). Other examples of transformations are possible and may be considered within the scope of the present disclosure.

It should be understood that computing system 900 is generally intended to represent a computing system or systems on which software 905 may be deployed and executed in order to implement enhanced email triage. However, computing system 900 may also be suitable as any computing system on which software 905 may be staged and from where software 905 may be distributed, transported, downloaded, or otherwise provided to yet another computing system for deployment and execution, or yet additional distribution.

Communication interface system 907 may include communication connections and devices that allow for communication with other computing systems (not shown) over a communication network or collection of networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing system 900 and any other computing system (not shown) may occur over a communication network or networks and in accordance with various communication protocols, combinations of protocols, or variations thereof. Examples of communication networks over which computing system 900 may exchange information with other computing systems include intranets, the Internet, local area networks, wide area networks, wireless networks, wired networks, virtual networks, software defined networks, data center buses, computing backplanes, networks, or any combination or variation thereof. The aforementioned communication networks and protocols are well known and need not be discussed at length here. However, some communication protocols that may be used include, but are not limited to, the Internet protocol (IP, IPv4, IPv6, etc.), the transfer control protocol (TCP), and the user datagram protocol (UDP), as well as any other suitable communication protocol, variation, or combination thereof. In any of the aforementioned examples in which information is exchanged, the exchange of information may occur in accordance with any of a variety of protocols, including FTP (file transfer protocol), HTTP (hypertext transfer protocol), REST (representational state transfer), WebSocket, DOM (Document Object Model), HTML (hypertext markup language), CSS (cascading style sheets), HTML5, XML (extensible markup language), JavaScript, JSON (JavaScript Object Notation), and AJAX (Asynchronous JavaScript and XML), as well as any other suitable protocol, variation, or combination thereof.

User interface system 909 may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 909. In some cases, the input and output devices may be combined in a single device, such as a display capable of displaying images and receiving touch gestures. The aforementioned user input and output devices are well known in the art and need not be discussed at length here.

User interface system 909 may also include associated user interface software executable by processing system 901 in support of the various user input and output devices discussed above. Separately or in conjunction with each other and other hardware and software elements, the user interface software and user interface devices may support a graphical user interface, a natural user interface, or any other type of user interface. For example, user interface 111 or user interface 121 may be presented through user interface system 909. In addition, user input made with respect to user interface 111 or user interface 121 can be input via user interface system 909.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The included descriptions and figures depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method of operating reminder services to facilitate email triage, the method comprising:

in a reminder service of a personal information service, receiving triage information indicative of an email that was selected in an email application for a follow-up action;

in response to receiving the triage information, the reminder service of the personal information service identifying at least one additional application associated with the follow-up action indicated by the triage information and communicating reminder information to a reminder service of an application service, wherein the associations between the follow-up action and the at least one additional application are configured based in part on a capability of the additional application to perform the follow-up action; and in the reminder service of the application service, communicating the reminder information to the at least one additional application with which to render a reminder, wherein the reminder about the follow-up action is surfaced in the at least one additional application.

2. The method of claim 1 wherein surfacing the reminder is achieved by rendering the reminder visually.

3. The method of claim 1 wherein the at least one additional application comprises a real-time communication application, a contacts application, a calendar application, a productivity application, or an additional email application, wherein the follow-up action comprises reading the email later, replying to the email later, placing a call related to the email later, or scheduling a meeting related to the email later.

4. The method of claim 3 wherein the follow-up action comprises one of a plurality of actions selectable via a triage menu in the email application, wherein the method further comprises associating the at least one additional application with the plurality of follow-up actions such that the follow-up action is associated with the additional email application and at least one other application.

5. The method of claim 1 wherein the at least one additional application comprises a contacts application and wherein the method further comprises surfacing the reminder in a user interface to the contacts application.

6. The method of claim 5 wherein the user interface to the contacts application comprises a plurality of contacts and wherein surfacing the reminder in the user interface to the contacts application comprises surfacing the reminder in visual association with at least one of the contacts that is associated with the email.

7. The method of claim 1 wherein the at least one additional application comprises a productivity application and wherein the method further comprises surfacing the reminder in a user interface to the productivity application.

8. The method of claim 7 wherein the user interface to the productivity application comprises a most recently used menu and wherein surfacing the reminder in the user interface to the productivity application comprises surfacing the reminder in visual association with a document represented in the most recently used menu that is associated with the email.

9. One or more computer readable storage media having program instructions stored thereon for implementing reminder services that facilitates email triage, wherein the program instructions, when executed by a computing system, direct the computing system to at least:
in a reminder service of a personal information service, receive triage information indicative of at least an email that was selected through an initial user interface to an email service for a follow-up action associated with the selected email;
in response to receiving the triage information, in the reminder service of the personal information service, identify a service of a plurality of services through which to surface a reminder about the follow-up action based at least in part on which of the plurality of services is able to perform the follow-up action and communicate reminder information to a reminder service of an application service; and
in the reminder service of the application service, communicate the reminder information with which to surface the reminder at least in part in a user interface to an additional service and a subsequent user interface to the email service, wherein the reminder about the follow-up action is surfaced in the user interface to the additional service.

10. The one or more computer readable storage media of claim 9 wherein to receive the triage information, the program instructions direct the computing system to receive the triage information from a mobile email application that surfaces the initial user interface, and wherein to communicate the reminder information, the program instructions direct the computing system to transfer, in the reminder service of the personal information service, the reminder information for delivery to another email application that surfaces the subsequent user interface.

11. The one or more computer readable storage media of claim 9 wherein to communicate the reminder information, the computing system transfers, in the reminder service of the personal information service, the reminder information for delivery to a service application associated with the service that surfaces the reminder in the user interface to the service.

12. The one or more computer readable storage media of claim 11 wherein the service application comprises at least one of a real-time communication application, a contacts application, a calendar application, a productivity application, and an email application, wherein the plurality of services comprises a real-time communication service, a contacts service, a calendar service, a productivity service, and the email service, and wherein the plurality of follow-up actions comprises reading the email later, replying to the email later, placing a call related to the email later, and scheduling a meeting related to the email.

13. The one or more computer readable storage media of claim 9 wherein the follow-up action comprises one of a plurality of actions selectable via a triage menu in the initial user interface to the email service, wherein the plurality of services includes the email service and wherein the program instructions further direct the computing system to associate the plurality of services with the plurality of follow-up actions such that the follow-up action is associated with the email service and at least one other service of the plurality services.

14. The one or more computer readable storage media of claim 13 wherein to identify at least the service from the plurality of services, the program instructions direct the computing system to identify, in the reminder service of the personal information service, at least the additional service from the plurality of services based at least in part on with which of the plurality of services the follow-up action is associated.

15. The one or more computer readable storage media of claim 14 wherein the program instructions further direct the computing system to communicate, in the reminder service of the personal information service, the reminder information with which to surface the reminder at least in part in an additional user interface to the additional service.

16. The one or more computer readable storage media of claim 15 wherein the service comprises the email service and wherein the additional service comprises the one other service.

17. An apparatus comprising:
one or more computer readable storage media having program instructions stored thereon that, when executed by a processing system, direct the processing system to at least:
in a reminder service of a personal information service, receive triage information indicative of an email that was selected in an email application for a follow-up action;
in response to receiving the triage information, in the reminder service of the personal information service, identify at least one additional application associated with the follow-up action indicated by the triage information and communicate reminder information to a reminder service of an application service, wherein the associations between the follow-up action and the at least one additional application are configured based in part on a capability of the additional application to perform the follow-up action; and in the reminder service of the application service, communicate the reminder information to the at least one additional application with which to surface the reminder, wherein the reminder about the follow-up action is surfaced in the additional application.

18. The apparatus of claim 17, wherein to identify the at least one additional application, the program instructions, when executed by the processing system, direct the processing system to select the at least one additional application from a plurality of applications, wherein the plurality of applications comprises a real-time communication application, a contacts application, a calendar application, a productivity application, or an additional email application, wherein the follow-up action comprises reading the email later, replying to the email later, placing a call related to the email later, or scheduling a meeting related to the email later.

19. The apparatus of claim 18, wherein the follow-up action comprises one of a plurality of actions selectable via a triage menu in the email application, wherein the program instructions, when executed by the processing system, direct the processing system to associate the plurality of applications with the plurality of follow-up actions such that the follow-up action is associated with the additional email application and at least one other application of the plurality applications.

20. The apparatus of claim 19, wherein the at least one additional application comprises a view of a plurality of emails and a plurality of filters corresponding to the follow-up actions, wherein each of the plurality of filters comprises a filter component corresponding to a different one of the follow-up actions.

* * * * *